Jan. 14, 1969  R. P. BROWN ET AL  3,421,675
FILM GUIDE

Filed Feb. 8, 1967  Sheet _1_ of 2

INVENTOR.
RICHARD P. BROWN
BY JOSEPH H. LANCOR, JR.

ATTORNEYS.

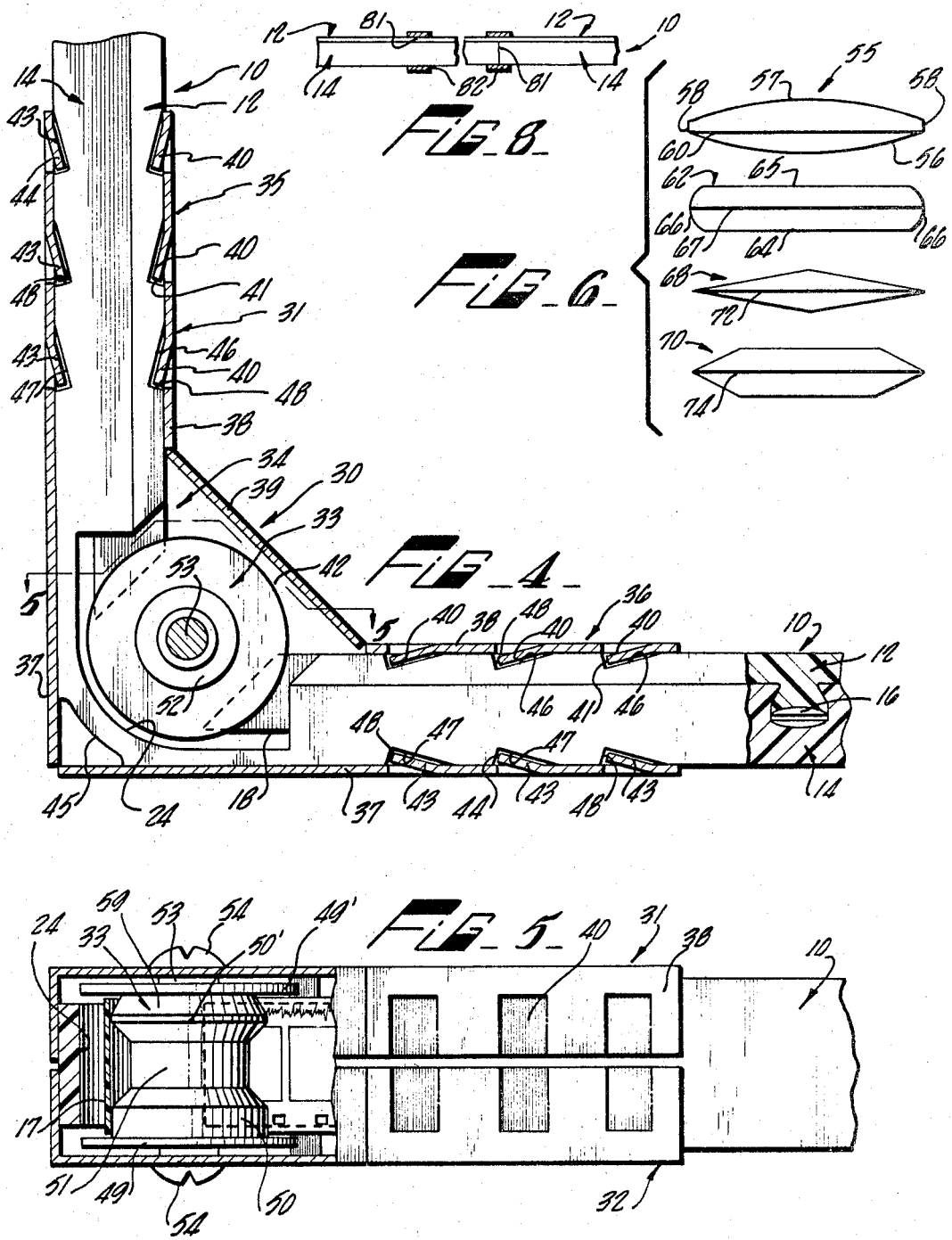

United States Patent Office 3,421,675
Patented Jan. 14, 1969

3,421,675
FILM GUIDE
Richard P. Brown, Monrovia, and Joseph H. Lancor, Jr., Arcadia, Calif., assignors to Consolidated Electrodynamics Corporation, Pasadena, Calif., a corporation of California
Continuation-in-part of application Ser. No. 511,486, Dec. 3, 1965. This application Feb. 8, 1967, Ser. No. 628,191
U.S. Cl. 226—196     3 Claims
Int. Cl. B65h 23/28; G03b 1/44; G03d 3/12

ABSTRACT OF THE DISCLOSURE

A guide system, including a guide duct and bend fixtures, for handling motion picture film is disclosed. The guide duct is arranged to encircle the film and to edge-guide and edge-support the film for movement essentially only along the length of the film without contact between the film and the duct intermediate the film edges. The bend fixtures are arranged to provide sharp turns in the film path and also provide guiding and supporting engagement with the film. The guide system is described in the context of a multi-station film projection system in which a length of film is transported serially through several spaced projection stations.

CROSS-REFERENCES TO RELATED APPLICATIONS

This application is a continuation-in-part of copending application Ser. No. 511,486 filed Dec. 3, 1965, now abandoned. The invention described herein is particularly useful in the context of the invention shown in commonly owned copending application Ser. No. 485,768 filed Sept. 8, 1965, now Patent No. 3,379,488.

BACKGROUND OF THE INVENTION

This invention relates to guides for strip material and in particular to a conduit and cooperating fixtures for guiding motion picture film between two points.

Copending application Ser. No. 485,768 describes a system for providing motion picture entertainment in the passenger enclosures of airplanes, railroad cars and other common carriers. The entertainment system uses a plurality of motion picture projectors located at spaced intervals within the passenger enclosure. A length of motion picture film extends from a film supply station serially through each of the projectors to a film take-up station. The film strip itself is the medium by which entertainment subject matter is distributed to the plurality of projectors. Preferably each projection station includes a projector lens arranged such that the images on the film are projected to backlight a projection secreen associated with and forming a part of the projection station. Means associated with each projection station pick up and distribute the sound accompanying the film presentation to the particular seats which are associated with the projection station.

In the intervals between the supply and take-up points and the projectors, a film conduit is provided for directing the film between the stations and for protecting the film from possible damage. The conduit also prevents the film from being allowed to snarl or tangle and keeps the film path clean and relatively uncontaminated.

SUMMARY OF THE INVENTION

The conduit comprises a length of tubing having an internal passage for guiding strip material between two points. The passage defines an oblong cross section having a major axis and a minor axis and is adapted to have the strip material inserted in the passage with its width transverse to the minor axis. The length of the passage major axis is selected such that it is slightly larger than the width of the strip material so that the strip material contacts the passage only along its lateral edges when inserted in the passage. The passage is arranged such that the strip material, such as motion picture film, is constrained to move in essentially one mode, viz, longitudinally through the channel provided for it while preventing the surfaces of the channel from contacting the film except along its edges. In one embodiment, a low-friction material covers the points which contact the film to aid film travel and reduce drag. In another, the duct itself is fabricated from one of several flexible low-friction polymers. An advantage of flexible polymers is that, at certain points, bends and twists can be imparted to the tubing without resort to joints and sharp angles typical of rigid tubing.

The tubing can be provided as a single or multi-piece extrusion. The multi-piece configuration makes possible the removal of a portion of the duct without dismantling the system. This is useful when it is desired to reach breaks in the film to effect splices or to clean the duct. Preferably, the material from which the duct is made is soft nylon, although polypropylene or a mixture of polypropylene and tetrafluoroethylene can be used; these polymers combine the several desirable features enumerated above.

DRAWINGS

The above-mentioned and other features and advantages of the invention will be better understood by reference to the accompanying drawings in which:

FIG. 4 is a cross-section view of a 90° bend fixture for the duct;

FIG. 5 is a view taken along line 5—5 of FIG. 4;

FIG. 6 is an illustration of other cross-sectional configurations of the passage within the film guide of this invention;

FIG. 7 is an illustration of another passage configuration; and

FIG. 8 is a fragmentary elevation view of a construction detail of the guide.

To illustrate the details of the guide of this invention, it will be described as it is used in the aforementioned entertainment system. It is anticipated that this guide has utility in other applications calling for the enclosed passage of strip material as, for example, magnetic tape, between two operational areas. The subsequent description, therefore, is not intended to limit the invention to a particular application.

DESCRIPTION OF THE PREFERRED EMBODIMENTS

Tubing or conduit interconnecting the supply and take-up points and the various projection stations in the multi-projector system is provided to protect the film from interference and contamination. These purposes are satisfied by a closed channel through which the film is adapted to pass. A specific dimension is imparted to the major axis of the cross-sectional configuration of the channel to impose a discipline on the strip and to constrain it to assume a relatively horizontal configuration with only the edges of the strip contacting the channel approximately at loci defined by the extremities of the major axis. Providing the strip has sufficient transverse stiffness, as is typified by tri-acetate motion picture film, the strip retains this configuration when being drawn down the length of the channel.

As a further refinement, the channel cross-sectional configuration is selected such that the portions of the cross section adjacent the ends of the major axis slant or curve away from the ends of the axis to further insure that no portion intermediate of the edges of the strip passing therethrough contacts the interior surfaces of the channel. This is especially important when the strip being passed through the channel is film having a photographic emulsion coated thereon. Elimination of contact of the duct with the emulsion-coated portion of the film prevents scratching of the sound track or film frames and prevents a static electric charge from being built up on the film; such a charge would significantly increase the drag and complicate the transmission of film through the system.

Figure 1:
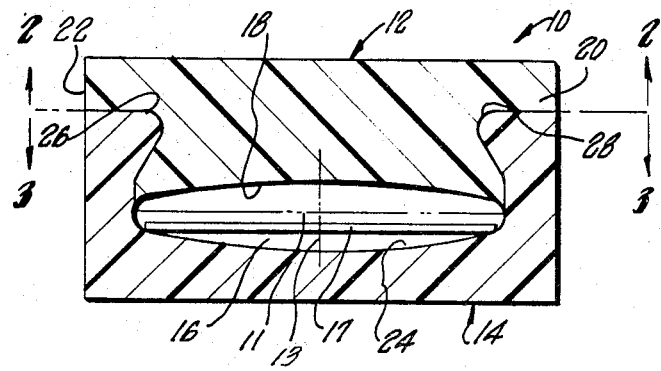
FIG. 1 is a section view in elevation of the duct of this invention in a two-piece configuration having a film strip located therein.

Referring now to FIG. 1, there is shown therein a conduit or duct 10 resembling a length of tubing. The elongate body of the tubing is defined by two dovetailed body members 12 and 14 coacting to define an internal enclosed channel 16 which is approximately elliptical in cross-sectional configuration and has a major axis 11 and a minor axis 13. Although such is not an absolute requirement, male member 12 and female member 14 can conveniently be fabricated by extruding lengths of the material comprising the duct. The two-piece construction of FIG. 1 illustrates a preferred embodiment of the invention. The material used to define the conduit body should be durable, shock resistant, and lend itself to a finishing operation for imparting a smooth finish to the passage walls, especially at the opposite ends of the major axis of the cross section.

Also contemplated within the scope of this invention is an integral one-piece extrusion with a channel or passage similar to the channel shown in FIG. 1. A one-piece extrusion has the advantage that it is less expensive to fabricate and has greater overall strength. It can also be more easily twisted and bent without the problem of springing male dovetail member 12 out of engagement with female dovetail member 14.

A strip of motion picture film 17 is shown in FIG. 1 in cross section in channel 16. The dimension of channel major axis 11 is chosen such that it is slightly greater than the width of the film strip. In the presently preferred embodiment, the chamber major axis is approximately .020 inch longer than the width of the film; the dimensional difference between the film and the channel has been exaggerated in FIG. 1 to illustrate this aspect of the invention. Sufficient concavity is imparted to the roof and floor surfaces of the channel to assure that contact of the duct with the film is had only along the film edges, even when the film is curved slightly upwardly or downwardly. Normally the film assumes a position parallel to and slightly removed from coincidence with the major axis of the passage.

Figure 2:
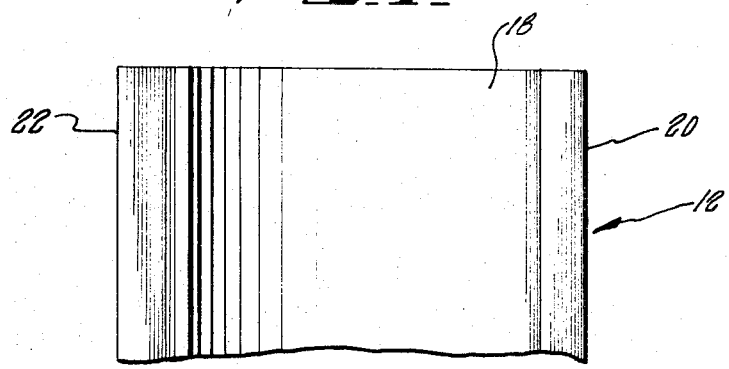
FIG. 2 is a view taken along lines 2—2 of FIG. 1.
Figure 3:
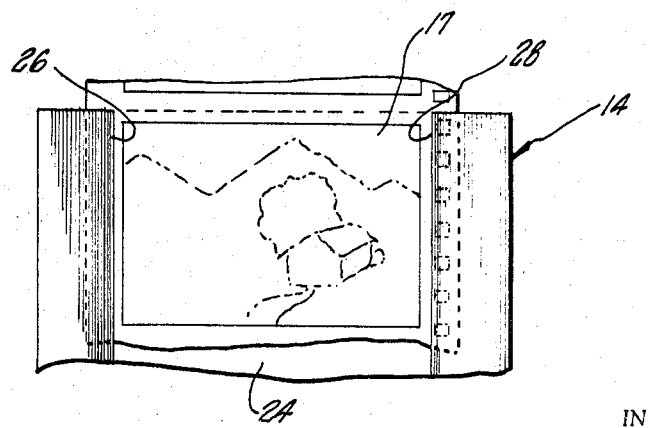
FIG. 3 is a view taken along lines 3—3 of FIG. 1.

Shown in FIGS. 2 and 3 are plan views of the male and female dovetail members of FIG. 1. As shown in FIG. 2, taken along lines 2—2 of FIG. 1, male member 12 has a raised, i.e., concave surface 18, located approximately in the center of the member and flanges 20 and 22 extending laterally outwardly from surface 18. In FIG. 3, female member 14 is depicted as it appears in a view taken along lines 3—3 of FIG. 1. This member has a concavely depressed surface 24 located approximately in the center of the member 14 and a pair of raised walls 26 and 28 on each side of surface 24.

Considering these two parts of the duct together, member 14 comprises a depressed, concave surface 24 defining a bottom or floor of channel 16. The opposing surfaces of walls 26 and 28 mate with the surfaces of member 12 along opposite edges to interlock the conduit components together. The interlocked surfaces, together with surfaces 18 and 24, define the boundaries of the channel through which the film passes.

As indicated, the duct can be used to interconnect adjacent stations in the entertainment system described in application Ser. No. 485,768. In its circuit through the system, the film experiences several abrupt changes of direction and several transitions from duct to projector and projector to duct. To aid film transmission at these points, it has been found that rollers are useful in conjunction with the duct for guiding the film. These rollers are similar to the guide rollers provided in conventional motion picture projectors and are normally mounted such that they straddle the film path. They are free to rotate under the influence of the passage of film over them. Such a roller is shown in FIGS. 4 and 5 as a component of a 90° bend fixture 30.

Fixture 30 includes a pair of shell members 31 and 32 and a guide roller 33. The shell members are mirror images of each other; each shell member is arranged to engage members 12 and 14 on one side of duct 10. The shell members preferably are made of sheet metal. Each shell member has a central portion 34 and leg portions 35 and 36 extending from the central portion at the angle desired to be defined by the fixture for duct 10; in the case of fixture 30, the angle is 90°. Each leg portion has parallel walls 37 and 38 spaced apart a distance only slightly greater than the overall dimension of duct 10 in a direction parallel to minor axis 13. Walls 37 intersect each other, whereas walls 38 abut opposite ends of a wall 39 adjacent the intersection of the leg portions.

Adjacent their intersections with wall 39, each of walls 38 defines a plurality of integral tongues 40 stamped out of the walls. The tongues, as shown in FIG. 5 extend normal to the lengths of the shell member leg portions at spaced locations along the leg portions. Each tongue has a free end 41 disposed toward a chamber 42 for roller 33, the chamber being bounded in part by walls 37 and 39. Each of walls 37 defines similar tongues 43, having free ends 44, at locations opposite respective ones of tongues 40.

At the apex of the bend provided in duct 10 by fixture 30, the flanges of conduit body member 14 which define walls 26 and 28 are cut away for a selected distance along the duct so that the width of member 14 in this area is somewhat less than the length of channel major axis 13. Centrally of this selected length, the surface of member 14 opposite from surface 24 is relieved as shown at 45 in FIG. 4. Duct body member 12 is rendered discontinuous in the area of the bend as shown in FIG. 4; preferably, as illustrated, the severance of member 12 is obtained in a manner which provides for the maximum extension of channel surface 18 toward, and actually to within the circumference of roller 33.

The exterior surfaces of duct 10 opposite from channel surfaces 18 and 24 are relieved to define transverse notches 46 and 47 for cooperation with tongues 40 and 43, respectively. The notches increase gradually in depth proceeding toward the bend in the duct, and have steeply inclined stop surfaces 48 adjacent the bend. The notch stop surfaces cooperate with tongue surfaces 41 and 44 to lock the duct in place in the fixture.

As shown in FIG. 5, the roller has end flanges 49 and 49' defining the outer circumference of the roller. Adjacent flange 49 the roller has a narrow cylindrical land surface 50 for engaging the film adjacent its edge adjacent to which the conventional sprocket holes are formed in the film. Adjacent the other flange 49', the roller defines a substantially narrower cylindrical land surface 50' spaced from and parallel to the flange 49'; between surface 50' and flange 49' the surface of the roller is tapered radially inwardly toward the flange at 59. Between the land surfaces the diameter of the roller is further reduced as at 51. The opposing surfaces of flanges 49 are spaced apart a distance essentially equal to the maximum dimension of duct channel 16 along major axis 11. Land surface 50 engages the film between the adjacent edge of the film and the film frame track and edge guides the film. Land surface 50′ engages the film between the film frame and sound tracks of the film. Thus, neither the film frame track nor the sound track of the film physically engages roller 33. The roller is rotatably mounted by a bearing assembly 52 to a supporting shaft 53.

Fixture 30 and duct 10 are assembled by engaging shell member 31 with the duct so that corresponding tongues 40 and 43 engage appropriate ones of notches 46 and 47. The roller and its supporting shaft is placed in chamber 42 of shell member 31. Shell member 32 is then engaged with the duct and the shell members are secured together by threading screws 54 through the shell members into suitable tapped holes in the opposite ends of shaft 53, thereby also properly locating the roller within the fixture. Thereafter, film may be threaded quite easily through the duct, even around the bend defined in the duct by the fixture.

It will be apparent that the bend defined by a fixture in accord with the foregoing description can encompass any angle desired. A fixture for a 90° bend has been shown and described merely for the purposes of example.

In addition to the approximately elliptical cross-sectional configuration of the passage in the duct described above, certain other cross-sectional configurations have been found to provide satisfactory transmission of film. Several of these alternate configurations are shown in FIG. 6. Cross-sectional configuration 55 provides a curved floor 56 and a curved ceiling 57 interconnected by straight end walls 58. The separation between walls 58 is chosen so that it is slightly larger than the width of a film strip 60 located therein. In this and the suceeding illustrations, the width of the film is shown approximately equal to the length of the major axis of the film channel to illustrate the small difference between these two dimensions. As before, the major axis is preferably .020 inch wider than the film.

In cross-sectional configuration 62, floor 64 and ceiling 65 are straight while the walls 66 are curved. The major axis of the passage corresponds to the point of maximum separation between the curved walls. A film strip 67 is shown in coincidence with the major axis.

The next two cross-sectional configurations 68 and 70 shown in FIG. 6 have diamond and hexagonal shapes, respectively. Film strips 72 and 74, respectively, are disposed along the major axes of these configurations with the dimensions thereof being chosen such that they are slightly longer than the width of the film. To prevent the film from snagging or bending in the corners of cross sections 68 and 70, a small amount of vertical relief 76, as shown in FIG. 7, is provided between the sides of the two cross sections adjacent the ends of the major axis. Approximately .005 inch of relief has been found to be sufficient.

In the preferred embodiment, the boundary walls of the passage present a low-friction surface to the strip or film such that a minimum amount of drag is imposed on the film. This low-friction surface can be achieved in several ways. In the first instance, the duct is an extrusion of one of several synthetic polymers, preferably soft nylon, although other polymers such as polypropylene or a mixture of polypropylene and tetrafluoroethylene can be used. In addition to having a low coefficient of friction, nylon is a material capable of resisting sudden shocks and pressures and the other types of wear and tear to which objects used in public accommodations are subjected. In addition, nylon or polypropylene can be heated and made malleable to enable bending and twisting where this is a requirement. Another way of obtaining a low-friction surface is to provide a duct of one of several types of metal in which a smooth surface on the interior passage has been provided. Although more expensive, metal ducting is also characterized by a low coefficient of friction and satisfies the other requirements for such ducting.

Whether duct material of an organic or metal composition is used, it may be found desirable to line portions or all of the interior passage with a coating of tetrafluoroethylene, especially in areas of severe bends or twists to further reduce the friction between the film and channel. In the airplane entertainment system described in the aforementioned copending application, the duct is required to go through several pronounced bends and twists intermediate the reel stations and the first and last projectors in the system and intermediate the various adjacent projectors; the use of tetrafluoroethylene coatings in these areas has been found to be beneficial.

FIG. 8 illustrates a preferred construction arrangement of guide 10, this construction having especial usefulness where the guide must extend over distances which are greater than the lengths of the sections of extruded male and female members used to form the guide. In these cases, members 12 and 14 are arranged in an overlapping "building block" manner so that end butts 80 between adjacent lengths of female members 14 lie intermediate the end butts 81 of adjacent male members 12. Preferably, butts 80 lie midway between butts 81, and vice versa. A clamp 82 is disposed around the guide at the position along the guide of each of butts 80 and 81. This construction relies upon the interlocking engagement of members 12 and 14 to provide a guide which has great strength and structural integrity, yet which is simple in arrangement.

As is evident from the preceding description, this invention provides a guide for strip material, such as motion picture film. The guide constrains the film to move longitudinally through the duct with minimum drag and static electricity. The duct has the further functions of keeping foreign material and contamination off the film and of protecting it in its transit. By limiting the cross section of the passage to certain configurations, contact between the duct itself and the emulsion surface of the film is prevented, thereby reducing the chances of scratching the emulsion or sound track and marring the film. In the areas of twists and bends in the duct channel, a low-friction coating provided on the interior of the duct provides a further safeguard against the possibility that the emulsion may contact the roof or floor of the passage through which the film moves.

What is claimed is:

1. A conduit for guiding strip material between two points, the conduit comprising an elongate body comprised of two elongate members defining cooperating male and female connection portions engaged in releasable mating interlocking relation and defining therebetween an internal passage lengthwise of the body, the passage in transverse cross section having an oblong configuration having a major axis and a minor axis, the length of the major axis being a selected amount greater than the width of the strip material so that the strip material contacts the conduit body only along the lateral edges of the strip material when the strip material is inserted into the passage with its width transverse to the passage minor axis.

2. In combination with a film guard defining an elongate film guiding conduit forming an enclosed passage therealong, the passage being configured in cross-sectional configuration so that a length of motion picture film and the like moving through the passage engages the conduit only along the edges of the film, the film having sprocket apertures formed therethrough adjacent one edge thereof and spaced parallel film frame and sound tracks defined by the film between the sprocket apertures and the other edge of the film, a bend fixture for defining in the length of the conduit a bend having a selected included angle, the fixture including means for maintaining the portions of the conduit next adjacent opposite sides of the bend in a preselected relation to each other, and a film supporting roller effectively interposed in the passage at the bend and configured to engage film passing along the passage around the bend substantially only along the sprocket apertured edge of the film and between the film frame and the sound tracks.

3. A film transport conduit comprising two elongated mated members defining a circumferentially closed duct for the passage of a film strip therethrough, one member having a portion intermediate the lateral edges of the member which along the length of the member is raised from one surface of the member relative to the remainder of the member, the raised portion defining therealong a surface concave away from said one member, the other member defining an open channel intermediate the lateral edges thereof, the open channel having a slightly concave floor surface and a pair of walls, the walls of said other member being adapted to mate with the lateral edges of the raised portion of the one member to define the duct.

References Cited

UNITED STATES PATENTS

| | | | |
|---|---|---|---|
| 1,347,103 | 7/1920 | Killman | 352—70 |
| 2,424,052 | 7/1947 | Pratt | 95—94 |
| 2,428,681 | 10/1947 | Pratt | 95—94 |
| 2,538,270 | 1/1951 | Pratt | 95—94 |
| 2,890,619 | 6/1959 | Waller. | |
| 3,041,953 | 7/1962 | Fulton | 95—94 |

M. HENSON WOOD, JR., *Primary Examiner.*

R. A. SCHACHER, *Assistant Examiner.*

U.S. Cl. X.R.

95—94